United States Patent
Jerkeby et al.

(10) Patent No.: US 10,491,591 B2
(45) Date of Patent: Nov. 26, 2019

(54) ENHANCED NETWORK SECURITY (71) Applicant: Telefonaktiebolaget LM Ericsson (publ), Stockholm (SE)

(72) Inventors: Christoffer Jerkeby, Malmo (SE); Ian Kumlien, Lund (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 349 days.

(21) Appl. No.: 15/034,476

(22) PCT Filed: Jan. 18, 2016

(86) PCT No.: PCT/EP2016/050859
§ 371 (c)(1),
(2) Date: May 4, 2016

(87) PCT Pub. No.: WO2016/155896
PCT Pub. Date: Oct. 6, 2016

(65) Prior Publication Data
US 2017/0104727 A1    Apr. 13, 2017

Related U.S. Application Data

(60) Provisional application No. 62/141,937, filed on Apr. 2, 2015.

(51) Int. Cl.
*H04L 29/06* (2006.01)
*H04W 76/10* (2018.01)
*H04W 84/18* (2009.01)

(52) U.S. Cl.
CPC ...... *H04L 63/0876* (2013.01); *H04L 63/0428* (2013.01); *H04L 63/0807* (2013.01);
(Continued)

(58) Field of Classification Search
CPC . H04L 63/08; H04L 63/0807; H04L 63/0853; H04L 63/0876; H04L 63/14; H04L 63/1441; H04L 63/1466
See application file for complete search history.

(56) References Cited

U.S. PATENT DOCUMENTS 6,263,445 B1*  7/2001  Blumenau ............... G06F 21/31
                                                      380/282
7,428,749 B2*  9/2008  McGarvey ............ H04L 9/3213
                                                      713/155
(Continued)

FOREIGN PATENT DOCUMENTS

EP        2197168 A1    6/2010
WO     2014165431 A1   10/2014

OTHER PUBLICATIONS

Wikipedia, "Message authentication code". Retrieved Apr. 29, 2019, published Apr. 8, 2019. Edit dated Mar. 30, 2015 and image dated Jun. 28, 2012. 12 pgs. (Year: 2012).*

(Continued)

*Primary Examiner* — Zachary A. Davis
(74) *Attorney, Agent, or Firm* — Leffler Intellectual Property Law, PLLC (57) ABSTRACT

A method of a mesh network involves generating by a source node a random token to be included in a query packet having a source ID and a query for a destination node; transmitting the query packet to the destination node through a relay node; receiving at the destination node the query packet; adding, by the destination node, the random token to a response packet for the source node; and transmitting the response packet including the random token to the source node through the relay node. Also disclosed are arrangements for a source node, a relay node and a destination node, as well as a mesh network.

10 Claims, 7 Drawing Sheets

(52) U.S. Cl.
CPC ...... *H04L 63/0853* (2013.01); *H04L 63/1466* (2013.01); *H04W 76/10* (2018.02); *H04W 84/18* (2013.01)

(56) References Cited

U.S. PATENT DOCUMENTS

| | | | | |
|---|---|---|---|---|
| 9,060,273 | B2* | 6/2015 | Brown | H04W 12/06 |
| 9,319,923 | B2* | 4/2016 | Izu | H04W 28/021 |
| 2003/0158914 | A1* | 8/2003 | Satomi | H04L 29/06 |
| | | | | 709/219 |
| 2004/0221049 | A1* | 11/2004 | Blumenau | H04L 29/06 |
| | | | | 709/229 |
| 2011/0131416 | A1 | 6/2011 | Schneider | |
| 2015/0222479 | A1* | 8/2015 | Kim | H04W 28/0236 |
| | | | | 370/218 |

OTHER PUBLICATIONS

PCT International Search Report, dated Apr. 19, 2016, in connection with International Application No. PCT/EP2016/050859, all pages.
PCT Written Opinion, dated Apr. 19, 2016, in connection with International Application No. PCT/EP2016/050859, all pages.
Dona Abraham et al., Approximate String Matching Algorithm for Phishing Detection, 2014 International Conference on Advances in Computing, Communications and Informatics, IEEE, Sep. 24, 2014, pp. 2285-2290.

* cited by examiner

Query header

| Token | Message Authentication Code | Destination address | Relay header | Payload |
|---|---|---|---|---|
| 32bit | 64bit | 16bit | 16bit | 40bit |
| 120bit | | | | 40bit |

Response header

| Token | Message Authentication Code | Payload |
|---|---|---|
| 32bit | 64bit | 72bit |

Only one reply allowed per token

Multicast response header

| Token | Message Authentication Code | Source address | Payload |
|---|---|---|---|
| 32bit | 64bit | 16bit | 56bit |

Only one reply allowed per source address

Multi-Response header

| Token | Message Authentication Code | Response Sequence | Payload |
|---|---|---|---|
| 32bit | 64bit | 8bit | 64bit |

Only one reply allowed per response sequence until the response sequence is out.

ENHANCED NETWORK SECURITY

CROSS-REFERENCE TO RELATED APPLICATIONS

This application is a national stage application under 35 U.S.C. § 371 of PCT/EP2016/050859, filed Jan. 18, 2016, which claims the benefit of U.S. Provisional Application No. 62/141,937, filed Apr. 2, 2015, which applications are hereby incorporated herein by reference in their entireties.

TECHNICAL FIELD

The present invention relates generally to the field of wireless communication in a mesh network. More particularly, it relates to enhanced network security in mesh networks.

BACKGROUND

Even though closed formulations (e.g. must, shall, is, etc) may be used in the following disclosure, this is not to be interpreted as essential features or facts without alternatives. Contrarily, the disclosure is to be interpreted as a number of examples and embodiments provided for illustrative and non-limiting purposes.

Mesh Network Concept

In a mesh network packets are typically relayed from a source node to a receiving node via "middle hands" such as one or more intermediate or relay node. The mesh network is typically distributed and messages may be passed in any direction. In mesh network there is typically no central base station to direct network traffic.

Relaying

A relay node may forward packets from a remote source node to a destination node through relays. A relaying event is sometimes referred to as a "hop" as the packet "hops" from one node to another until it reaches its destination. A relay node typically forwards a data packet using either routing, flooding or a hybrid manner
  A flooding relay forwards all packets it receives to all nodes it can reach.
  A routing relay forwards a packet only to other nodes close to the destination based on a routing table.
  A hybrid relay uses both flooding and routing to forward a packet to a given destination based on the characteristics of the network design.

Stateful or Stateless

A relay node relaying a message may or may not know whether a packet contains a query or a response. If the relay node does not know if the packet it is relaying is a query or response it is typically considered as a stateless relay node. If the network only consists of stateless relay nodes it is typically considered as a stateless network. If a relay node has the ability to distinguish between query and response, and by that, have the ability to keep track of the session between two nodes, it is considered a state-full relay node. A network consisting of state-full relay nodes may typically be considered a state-full network.

Network Packets

A network packet typically has a section that is considered a header and section that is considered a payload. The header comprises fields describing source, destination, state and consistency checks. The payload section comprises the data being transferred from one application to another. The header information may be used by the network to distinguish the routing path, state and/or consistency of a packet in a network. The packet header fields typically have a pre-defined size. Changing the size of a field typically breaks the protocol, which may result in the packet not being understood.

To prevent malicious attacks on the network and also to prevent flooding of the network some techniques have been developed.

Sequencing

In order to provide a network where an existing packet will not be captured by an attacker and sent again to the network to emulate an historical event, many network architects typically design the packet header to include a sequence number.

The sequence number typically comes in three forms.

1. A global network sequence counter. This counter method is based on the idea that all nodes can keep track of the most recent packet in the network and by investigating the header of this network discovering the sequence number. When the node is about to transmit its own new packet in to the network, it increments the previous network sequence counter by one to establish a new sequence.

2. Relational node sequence. The relational node sequence is initiated uniquely and maintained for each relationship a node has with another. The relational node sequence typically increments by one for each packet being transmitted between any two given nodes. The sequence is typically different depending on which nodes are communicating.

3. Network time counter. This is a global sequences counter that may increase once for every second in the entire network. A destination typically only accepts incoming packets that are addressed with a reasonable time. The range of time has to depend on the accuracy of the clocks in the network and the time of delivery of the packet.

Typically, sequence number model 1 and 2 require all sequence numbers to be unique while model 3 requires only the time to be accurate. The sequence number aims at protecting the network from having the same packets sent twice.

Time (Hops) to Live

A packet header may also contain a field describing Time To Live (TTL). TTL may refer to how many hops a packet may live in the network, i.e. how many relays it may be subjected to. For every relay forward of a data packet, the TTL counter is lowered by one. When the TTL reaches zero the packet will no longer be relayed. This typically aims at preventing the packet from entering endless loops in the network which may result in a flooded and/or congested network.

Limitations of Current Existing Sequencing Solutions

The current existing sequence solutions all have one shared major limitation.

The sequence number typically has a limited size in the packet header. This means that once that size has reached its maximum it will wrap back to previously used sequence numbers. Once this occurs an attacker may use previously recorded packets and transmit them back in to the network to cause an intrusion event For example a recorded door unlock command may be transmitted again so that the door unlocks.

The global sequence counter is typically hard to maintain as all nodes may not always receive all packets. It is also likely that existing sequence numbers will collide if two nodes are transmitting at the same time. Resolving such collision typically results in a bad user experience and may take a long time. A global counter may also wrap too fast if there are many nodes in the network.

The relational node sequence counter may also be hard to maintain for the same reason, and it also may require a large amount of memory to maintain tracking of all relationships. The relational counter does typically not work very well with group and multicast messages.

The network time counter may wrap on a pre-defined date making the time of the wrap known to the attacker. This may make the network an easier target to inject packets into. The accepted range of the network time counter is typically defined by the accuracy of the clock-drift of all other nodes. As a clock may slow down or speed up, synchronizing this field is typically difficult. The accepted range would also typically need to be adapted to the physical distance between the nodes and the amount of hops required to deliver the packet.

Time To Live

As the Time To Live (TTL) field typically requires modification from all relay nodes from source node to destination node, it cannot be encrypted or integrity protected. This opens up for an attacker recording a packet and changing the TTL header value to the maximum value and replaying it in to the network. In that event the network will relay the same packet between all relay nodes until the TTL has reached zero. This typically causes increased network traffic and disturbances in the network that might limit a vital security function from operating. For example, an alarm or a window sensor may be hindered from reporting a physical intrusion.

Statelessness

A stateless network cannot carry information where a given query is given a given response in a pre-defined set of time. This limitation disables the possibility to transmit Internet Protocol packets over a stateless carrier.

Therefore, there is a need for methods, arrangements of mesh network nodes and a mesh network for enhancing network security without affecting overall network traffic.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide methods, nodes and arrangements of a mesh network for enhancing network security.

According to a first aspect this is achieved by a method of a mesh network. The method comprises generating, by a source node, a random token to be comprised in a query packet comprising a query for a destination node. The query packet comprising the random token, a source ID and the query is transmitted to the destination node through a relay node. The query packet is received at the destination node. The destination node adds the random token to a response packet for the source node. Then the method comprises transmitting the response packet comprising the random token to the source node through the relay node.

In some embodiments, the random token comprises a random value of a token size. For example, the token may comprise 30 bits forming a random value. In some embodiments the token may be 32 bits. In some embodiments the token may comprise 30 bits indicating the token value and two bits indicating the token type.

In some embodiments, the response comprising the random token is only relayed during a pre-defined time frame. The pre-defined time frame may for example be 400 ms, but other time spans are possible. In some embodiments, the time frame may be dynamically set based on network conditions, such as congestion, signal strength amount of nodes, etc. In some embodiments if a token is received when the pre-defined time frame has expired, the token may be deemed invalid and the data packet may be discarded.

In some embodiments, a communication session is initiated between the source node and the destination node when the response packet comprising the random token is received at the source node. In some embodiments the communication session may define a path in the mesh network to be used for sending data packets in the communication session. In some embodiments several different paths may be used for sending data packets during the communication session.

In some embodiments, the relay node keeps track of a token state, ensuring that the response packet comprising the random token is only relayed within a pre-defined time frame. In some embodiments, the token state indicates if the random token is valid. In some embodiments a random token is deemed valid if the random token was received in a query packet along with a source ID that is not stored in a memory of the relay station. In some embodiments, a random token is deemed valid if the random token was received in response packet along with a source ID that is stored in the memory of the relay station.

In some embodiments, the relay node, upon receiving the query packet comprising the random token, source ID and query to the destination node, determines if the random token and source ID are stored in a memory of the relay node, and if the random token and source ID are not stored in the memory of the relay node, then the relay node stores the random token and an ID of the first node in a memory during a pre-defined period of time and may add a relay header. The relay header may comprise an ID of the relay node and/or a frequency. The relay node may forward the query packet to the destination node. If the relay node determines that the random token and source ID are stored in the memory of the relay node, then the relay node may refrain from forwarding the data packet. Thus it is ensured that the nodes do not risk re-transmitting already distributed packets.

In some embodiments, the destination node, upon receiving the query, may generate the response packet comprising the random token, source ID and the response to the source node and generate a Message Authentication Code. The destination node may validate the response packet using the Message Authentication Code.

In some embodiments, the Message Authentication Code may encrypt a data packet and generate a signature. The signature may be used to decrypt the message by a Message Authentication Code at a destination node.

In some embodiments, the relay station, upon receiving the response packet comprising the random token, source ID and response to the first node may determine if the random token and source ID is stored in the memory of the relay node. If such is the case, the relay node may de-activate the random token and relay the data packet to the source node. If the random token and source ID is not stored in the memory of the relay node, the relay node may refrain from relaying the response packet to the source node.

In some embodiments, the random token is de-activated by removal along with the source ID from the memory of the relay node.

A second aspect is a computer program product comprising a computer readable medium, having thereon a computer program comprising program instructions, the computer program being loadable into a data-processing unit and adapted to cause execution of the method according to the first aspect when the computer program is run by the data-processing unit.

A third aspect is an arrangement of a node in a mesh network wherein the node is a source node comprising a random token generator, a controller, and a Message Authentication Code module. The random token generator is configured to generate a random token. The controller is also configured to add a source ID, the random token and a query to a query packet to a destination node. The Message Authentication Code module is configured to encrypt the query packet and provide it with a signature.

In some embodiments, the source node further comprises a transmitter configured to transmit the query packet comprising the random token, source ID and query to the destination node through a relay node, and a receiver configured to receive a response packet comprising a response from the destination node relayed through the relay node.

A fourth aspect is an arrangement of a node in mesh network being a destination node. The destination node comprises a controller and a Message Authentication Code module. The controller is configured to extract a random token comprised in a received query packet comprising a query and a source ID from a source node relayed through a relay node. The controller is further configured to add the extracted random token and a response along with the source ID to a response packet to the source node. The Message Authentication Code module is configured to decrypt the received query packet and to encrypt the response packet to the source node.

In some embodiments the destination node further comprises
a receiver configured to receive a query packet comprising a query, source ID and a random token from the source node relayed through the relay node; and
a transmitter configured to transmit the response packet comprising the random token, source ID and response to the source node through the relay node.

A fifth aspect is an arrangement of a node in mesh network being a relay node. The relay node comprises a controller and a memory.

The controller is configured to determine if a random token along with a source ID comprised in a received query packet comprising a query from a source node is stored in the memory, thereby determining if the random token is valid. The memory is configured to store the random token and the source ID during a pre-defined period of time if the random token is determined to be valid.

In some embodiments, the controller is further configured to determine if the random token received in the query packet is already present in the memory, and if so determine that the random token is invalid and discard the data packet.

In some embodiments, the controller is further configured to relay the query packet to the destination node if the controller determines that the random token is valid.

In some embodiments, the relay node further comprises a receiver configured to receive a query packet comprising a source ID, a query and a random token from the source node and/or a data packet comprising a random token, a source ID and a response from the destination node. The relay node may further comprise a transmitter configured to transmit the query packet to the destination node and/or the response packet to the source node.

In some embodiments, the controller is further configured to determine if the random token and source ID received in the response packet is stored in the memory, and if so determine that the random token is valid and de-activate the random token from memory by removing it and the source ID from memory. If the controller determines that the random token and source ID is not stored in the memory, the controller is configured to determine that the random token is invalid and discard the response packet.

A sixth aspect is a mesh network comprising a source node and a destination node and at least one relay node. The source node is configured to generate a random token to be comprised in a query packet comprising a query for the destination node and transmitting the query packet comprising the random token value, a source ID and the query to the destination node through the relay node.

The destination node is configured to receive the query packet and add the random token value to a response packet for the source node.

The destination node is further configured to transmit the response packet comprising the random token value to the source node through the relay node.

An advantage of some embodiments is network security is enhanced.

Another advantage of some embodiments is that a secure routing protocol is enabled.

Another advantage of some embodiments is that the size of the header of data packets is reduced, thus leaving more room for pay load.

Another advantage of some embodiments is that looping of data packets is reduced.

Another advantage of some embodiments is that Time To Live may be omitted from data packets.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where the security of a mesh network is enhanced.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

Figure 1:
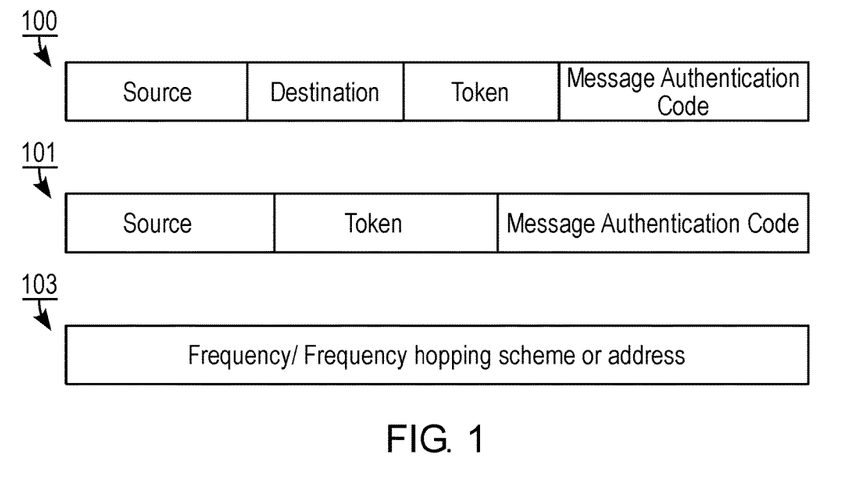
FIG. 1 is a schematic drawing illustrating an example header according to some embodiments.

As described above, each issued data packet comprises a header. FIG. 1 illustrates a source header 100 of a source packet (that is, a packet originating from a source node), a destination header 101 of a destination packet (that is, a packet originating from a destination node) and a relay header 103 (that is, a header added by a relay node to a packet from a source node or a destination node).

A packet issued by a source node comprises a header comprising fields indicating the source ID, destination ID, a token and a Message Authentication Code (MAC). A source node wanting to contact a destination node assembles a data packet (also referred to as query packet in this disclosure) with the header format 100. The token is made up of a random value of a token size. For example, the token size may be 30 bits large and the content is a random value that is generated by a random generator. A person skilled in the art would realize that other token sizes are possible. This ensures that the token is not predictable or is re-used on a regular basis. The message authentication code cryptographically validates the consistency of the data packet. The data packet also comprises a query for the destination node, and the data packet is transmitted from the source node to the destination node.

As the destination node receives the data packet from the source node, the destination node assembles a data packet (also referred to as response packet in this disclosure) comprising a response to the query. The destination header 101 of the data packet comprising the response has fields comprising the source ID, token and Message Authentication Code.

The token comprised in the destination header 101 will have the same random value as the token received in the source header 100. The data packet comprising the response is then validated by the Message Authentication Code of the destination header 101. The Message Authentication Code (MAC) encrypts the message by producing a MAC algorithm by using a specific key. The MAC algorithm results in a MAC signature which is appended to the message prior to transmission.

The data packet comprising the response is then transmitted from the destination node to the source node.

During transmission between source node and destination node, the data packets will be relayed along the path by one or more relay nodes. As the relay node receives a data packet addressed to a source or a destination node, it will add its own relay header 103 to the data packet.

The relay header 103 comprises fields comprising frequency/frequency hopping scheme or address. The frequency or address describes the relay node's address or frequency for where to return a response data packet.

Figure 2A:
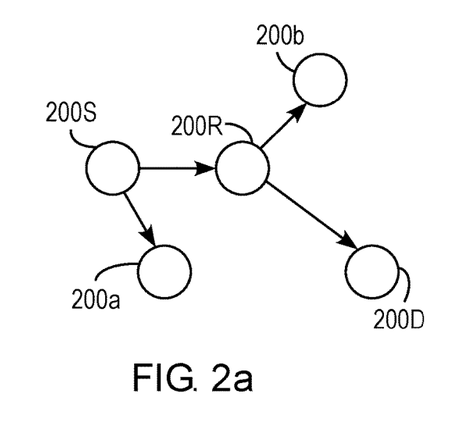
FIGS. 2a and 2b each illustrates example nodes in a mesh network according to some embodiments.
Figure 2B:
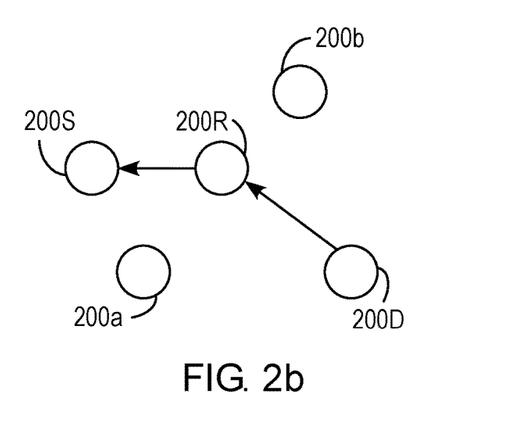

FIGS. 2a and 2b illustrates an example mesh network according to some embodiments. In the example mesh network five nodes are present, 200S, 200D, 200R, 200a, 200b.

In FIG. 2a, source node 200S issues a data packet comprising a query for destination node 200D, a random token and a source ID. In some embodiments, the data packet is broadcasted to all neighboring nodes, 200a, 200R, 200b. In some embodiments, the whole network is flooded.

A node receives the data packet and stores the random token along with the source ID in a memory of the relay node 200a, 200R, 200b. Then the relay node 200a, 200R, 200b, adds the relay header to the data packet and relays it further.

In FIG. 2b, the data packet comprising the query has reached its destination at destination node 200D. The destination node 200D assembles a response data packet to the source node comprising the same random token and source ID as comprised in the received data packet comprising the query.

Because the data packet comprising the query arrived with the relay header, the destination node will know to which relay node it must transmit the data packet comprising the response. In the example of FIG. 2b this will be relay node 200R.

By issuing a random token value with each query, a responding node may use the same random token to respond. The response may only be relayed if the token is present and transmitted during a pre-defined timeframe. This will create a session between the query and response and it will make the session uniquely distinguishable from other active sessions. Thus, more security is added to a mesh network according to this disclosure than compared to existing solutions using less resources.

Figure 3:
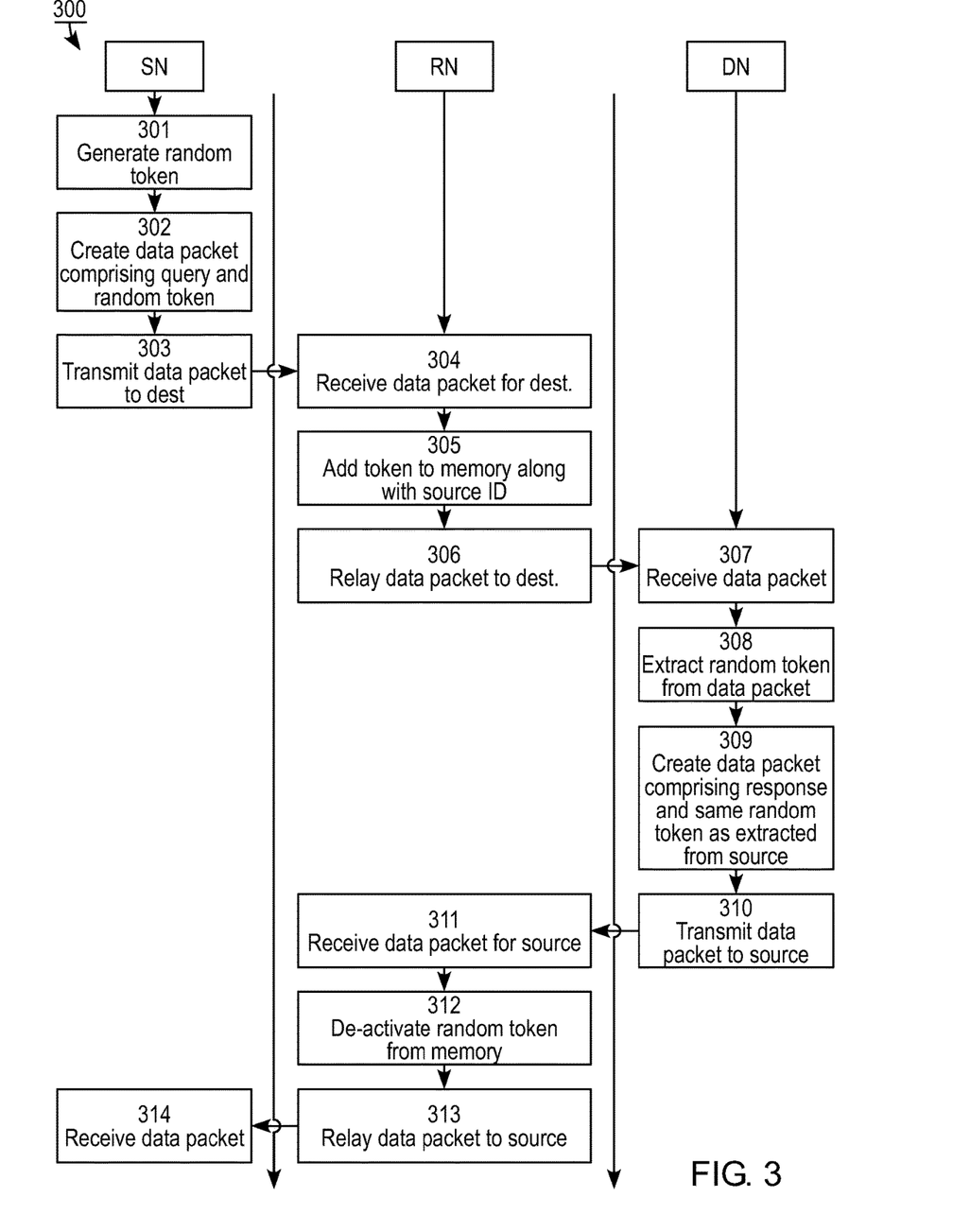
FIG. 3 is a combined flowchart and signaling diagram according to some embodiments.

FIG. 3 illustrates an example method 300 according to some embodiments. In FIG. 3 three nodes: source node SN, relay node SR and destination node DN communicate data packets in between each other. The source node SN, relay node SR and destination node DN may for example be the source node 200S, relay node 200R and destination node 200D as described in conjunction with FIGS. 2a and 2b.

Example method 300 begins in 301 where the source wanting to send a query to the destination node DN generates a random token. In 302 of the example method 300 the source node SN assembles a data packet (also referred to as query packet in this disclosure) comprising the query to the destination node DN, the random token, a source ID and a Message Authentication Code (compare with source header 100 in FIG. 1).

Then in 303 the source node SN transmits the query packet to the destination node DN. The query packet is typically transmitted using broadcast transmission.

The example method 300 continues in 304 where the relay node RN received the query packet comprising the query for the destination node DN. In 305 the relay node adds the random token to its memory along with the source ID. In 306, the relay node RN relays the query packet to the destination node DN. In some embodiments the relay node RN further broadcasts the query packet to other relay nodes until it reaches its destination.

The relay node may also add a relay header (for example, the relay header 103 as seen in FIG. 1) to the query packet, thereby identifying what frequency or address a data packet should be forwarded to upon return to the source node SN.

In 307 of example method 300 the destination node DN receives the query packet. In 308 the destination node DN extracts the random token from the query packet. In 309 the destination node generates a data packet (also referred to as response packet in this disclosure) comprising a response, the same random token as in the query packet, the source ID and Message Authentication Code (compare with destination header 101 in FIG. 1). In 310 the destination node DN transmits the response packet to the source node SN. Because the query packet comprise the relay header with the frequency or address of the relay node RN, the destination node will know that the response packet shall be transmitted to the relay node RN in order to follow the shortest path back to the destination node DN.

The example method 300 continues in 311 where the relay node RN receives the response packet. In 312 the relay node RN de-activates the random token by removing it from its memory. In 313, the relay node RN relays the response packet to the source node SN, which is received in 314 by the source node SN.

Figures 4, 5:
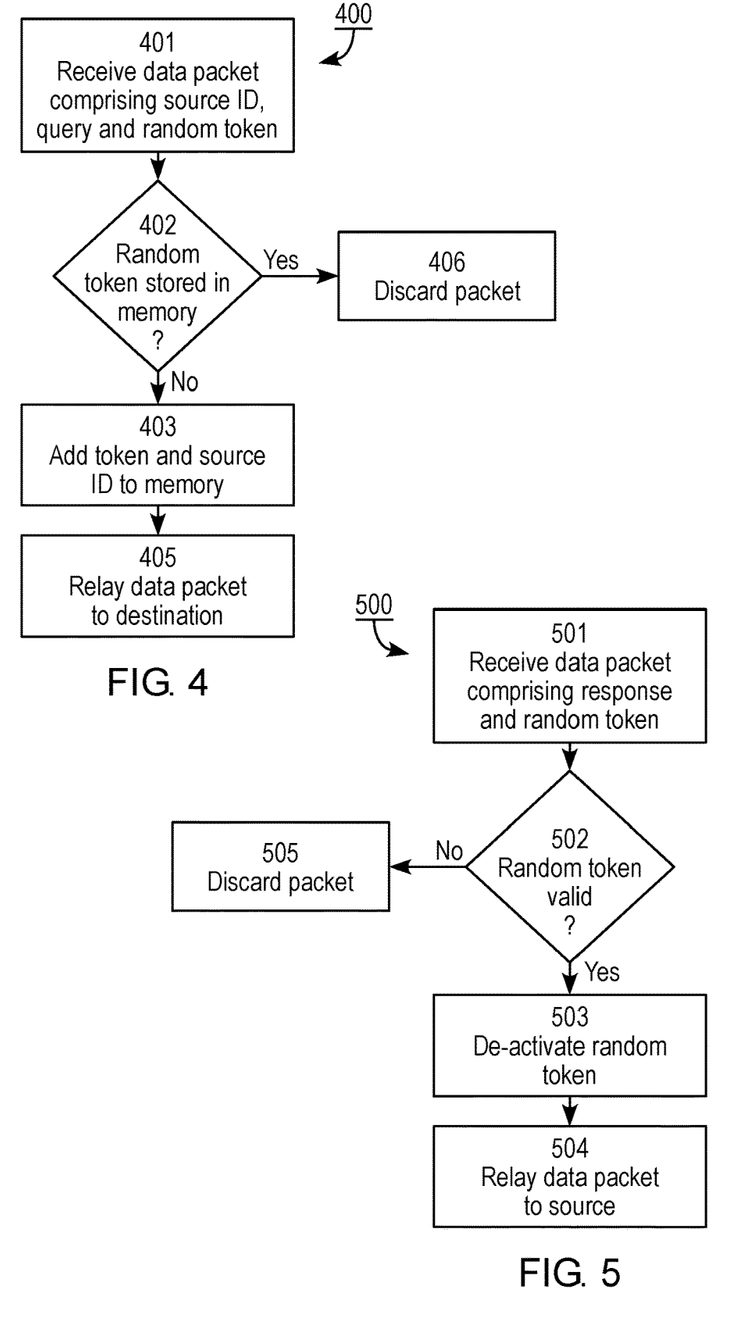
FIG. 4 is a flowchart illustrating an example method according to some embodiments.
FIG. 5 is a flowchart illustrating an example method according to some embodiments.

In order to enhance network security and avoid having packets with compromised TTL integers, the relay node may in some embodiments determine if a random token comprised in a query packet is already stored in memory. FIG. 4 illustrates an example method 400 to be carried out in a relay station (for example the relay station as described in conjunction with FIGS. 1, 2 and 3) according to some embodiments.

Example method 400 starts in 401 where the relay node receives a query packet. In 402 the relay node determines if the random token comprised in the query packet is stored along with the source ID in a memory of the relay node. If the relay node determines that the random token is stored along with the source ID in the memory, then the relay node has already received the content of the query packet and the method continues to 406 where the query packet is discarded and not relayed further.

If the relay node receives a query packet comprising a random token and a source ID which is already stored in the memory, it is an indication that the received packet is sent by an attacker trying to compromise the network.

If in 402 it is determined that the random token and source ID of the query packet is not stored in the memory, the method 400 continues to 405 where the relay node adds a relay header (for example the relay header 103 in FIG. 1) to the query packet and forwards it to the destination node.

This procedure ensures that packets which have already been transmitted are not re-transmitted.

In some embodiments, example method 400 may be incorporated into example method 300.

In FIG. 5, an example method 500 of a relay node (for example the relay node as described in conjunction with FIGS. 1, 2, 3 and 4) is illustrated. Example method 500 may in some embodiments be incorporated into example method 3 and/or example method 4.

The example method 500 starts in 501 where the relay node receives a response packet to a source node (for example the source node as described in conjunction with FIGS. 1, 2, 3, and 4). In 502 the relay node determines if the random token of the response packet is valid by determining if the random token along with the source ID is stored in a memory of the relay station. If in 502 the random token along with the source ID is determined to not be stored in the memory the example method 500 continues to 505 where the response packet is discarded. If in 502, it is determined that the random token along with the source ID is stored in the memory of the relay station, the example method 500 continues to 503 where the relay station de-activates the random token. The de-activation may be made by erasing the source ID and random token from the memory of the relay station. The example method 500 then proceeds to 504 where the response packet is relayed to the source node.

A random token along with a source node may be de-activated and deemed as invalid either because it has already been received by the relay node, or because a predetermined period of time has expired. The predetermined period of time may dictate for how long a random token may be valid, that is for how long it may be active in a network. A typical period of time may be 400 ms. Using the period of time may reduce the risk of having a packet being "ping ponged" in the network, that is, being relayed several times without finding its destination. Thus the need for a Time To Live indicating allowable hops is avoided. This may also reduce the risk of security attacks on the network.

The solution solves the issues associated with the need for a time to live. The packets may be stateful and the relays may only forward responses that belong to an active token. The header size will be smaller and leave more room for a larger payload. The packets would typically not be looping as the token and token response will only be forwarded once during the activation-time of the token.

Figure 6:
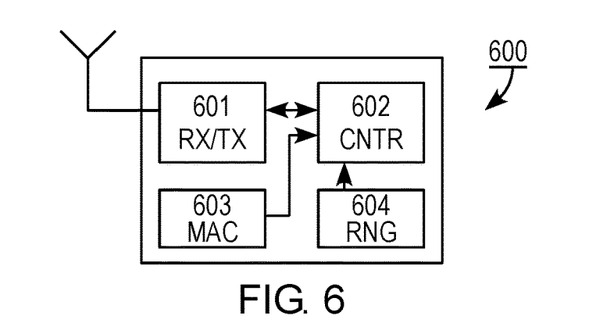
FIG. 6 is a schematic drawing illustrating an example arrangement according to some embodiments.

FIG. 6 illustrates an example arrangement according to some embodiments. Example arrangement 600 may for example be an arrangement of a source node, for example the source node as described in conjunction with FIGS. 1, 2, 3, 4 and 5. Example arrangement 600 comprises a transceiver (RX/TX) 601, a controller (CNTR) 602, a Message Authentication Code module (MAC) 603 and a random token generator (RNG) 604.

The transceiver 601 may in some embodiments be a separate transmitter and a separate receiver.

The controller 602 is configured to receive a random token from the random token generator 604 and generate a query packet comprising the random token, a source ID and a query (compare with 302 of method 300 in FIG. 3). The Message Authentication Code module 603 is configured to encrypt the query packet and provide it with a signature. The controller 602 is then further configured to cause the transceiver to transmit the query packet (compare with 303 of method 300 in FIG. 3).

Figure 7:
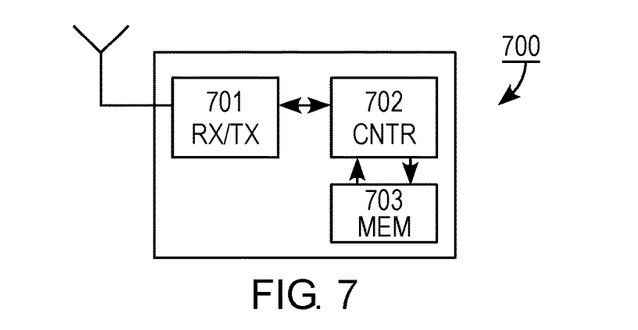
FIG. 7 is a schematic drawing illustrating an example arrangement according to some embodiments.

FIG. 7 illustrates an example arrangement according to some embodiments. Example arrangement 700 may for example be an arrangement of a relay node, for example the relay node as described in conjunction with FIGS. 1, 2, 3, 4 and 5. Example arrangement 700 comprises a transceiver (RX/TX) 701, a controller (CNTR) 702, and a memory (MEM) 703. Example arrangement 700 may be configured to carry out the method 400 and or the method 500 as described in FIGS. 4 and 5.

The transceiver 701 may in some embodiments be a separate transmitter and a separate receiver.

The transceiver 701 is configured to receive a query packet or a response packet comprising a random token and a source ID.

The controller 702 is configured to determine if the random token along with the source ID is already stored in the memory 703. If the received packet is a query packet, then if the random token along with the source ID is stored in the memory 703, the controller 702 is further configured to discard the query packet and refrain from relaying it (compare with 406 of method 400 in FIG. 4) If the received packet is a response packet, and the controller determines that the random token along with the source ID is present in memory 703, the controller 702 is configured to de-activate the random token by removing it and the source ID from memory 703 (compare with 503 of example method 500 in FIG. 5). If the random token has been deemed valid by the controller 702, then the controller 702 is configured to cause the transceiver to relay the query or response packet.

In some embodiments the controller may be further configured to add a relay header (e.g. the relay header 103 as described in conjunction with FIG. 1) to a query packet comprising a valid random token before relaying it further.

Figure 8:
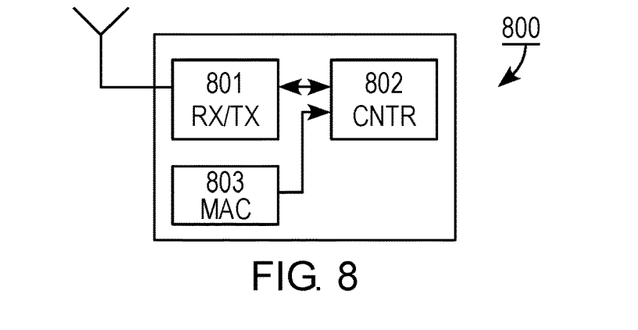
FIG. 8 is a schematic drawing illustrating an example arrangement according to some embodiments.

FIG. 8 illustrates an example arrangement according to some embodiments. Example arrangement 800 may for example be an arrangement of a destination node, for example the destination node as described in conjunction with FIGS. 1, 2, 3, 4 and 5. Example arrangement 800 comprises a transceiver (RX/TX) 801, a controller (CNTR) 802, a Message Authentication Code module (MAC) 803. The arrangement 800 may be configured to carry out the method 300 as described in FIG. 3.

The transceiver 801 may in some embodiments be a separate transmitter and a separate receiver.

The transceiver 801 is configured to receive a query packet comprising a random token, source ID and a Message Authentication Code signature (compare with 307 of method 300 in FIG. 3).

The controller 802 is configured to extract the random token and source ID (compare with 308 of method 300 in FIG. 3). The Message Authentication Code module 803 is configured to decrypt the message using an encryption key corresponding to the Message Authentication Code signature comprised in the query packet.

The controller 802 is then further configured to generate a response packet comprising the same random token as received in the query packet, the source ID and a response (compare with 309 of method 300 in FIG. 3). The Message Authentication Code module 803 is configured to encrypt the response packet and provide it with a signature.

In some embodiments, the received query packet may also comprise a relay header (for example the relay header 103 as described in conjunction with FIG. 1) comprising the frequency or address of a relay node which relayed the query packet from a source node (for example the relay and source node as described in FIGS. 1, 2, 3, 4, 5, 6 and 7).

In some embodiments, the controller 802 is configured to cause the transceiver 801 to transmit the response packet to the source node through the relay node pertaining to the frequency or address comprised in the relay header.

In some embodiments, the example arrangements 600, 700 and 800 may be comprised in a single node. That is, in some embodiments a relay node may be a source node or a destination node and vise versa.

Figure 9:
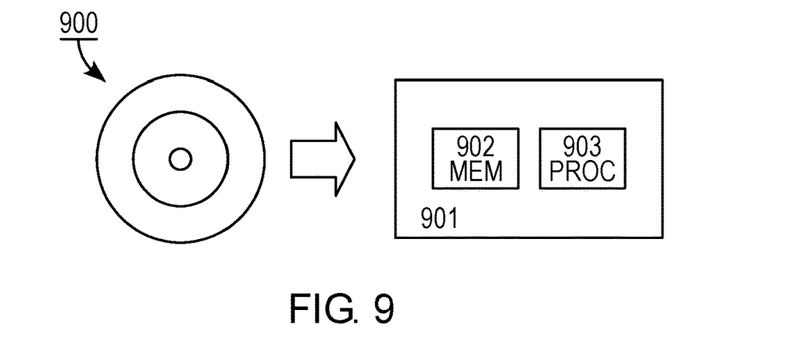
FIG. 9 is a schematic drawing illustrating a computer program product according to some embodiments.

FIG. 9 illustrates an example computer program product according to some embodiments. According to some embodiments, computer program product comprises a computer readable medium 900 such as, for example, a diskette or a CD-ROM. The computer readable medium may have stored thereon a computer program comprising program instructions. The computer program may be loadable into a data-processing unit 901, which may, for example, be comprised in a mobile terminal. When loaded into the data-processing unit, the computer program may be stored in a memory (MEM) 902 associated with or integral to the data-processing unit (PROC) 903. According to some embodiments, the computer program may, when loaded into and run by the data-processing unit, cause the data-processing unit to execute method steps according to, for example, the methods shown in any of the FIGS. 3, 4 and 5.

In some embodiments a source node (for example the source node as described in conjunction with any of FIGS. 1, 2, 3, 4, 5, 6, 7, and 8) may send a query packet that requires more than one response packet. For example, if the source node asks a video recorder to supply images, several response packets pertaining to the same query may be sent.

This may be realized by introducing a token sequence in the random token. For example, out of the 30 bits comprised in the token 4 bits may be used to indicate a token sequence. The token sequence may allow for 256 replies before it becomes invalid.

In some embodiments, as a query packet is relayed through several relay stations each relay station may overwrite the relay header added by the previous relay station.

In some embodiments, the relay header from the first relay station is kept throughout the path.

Figure 10:
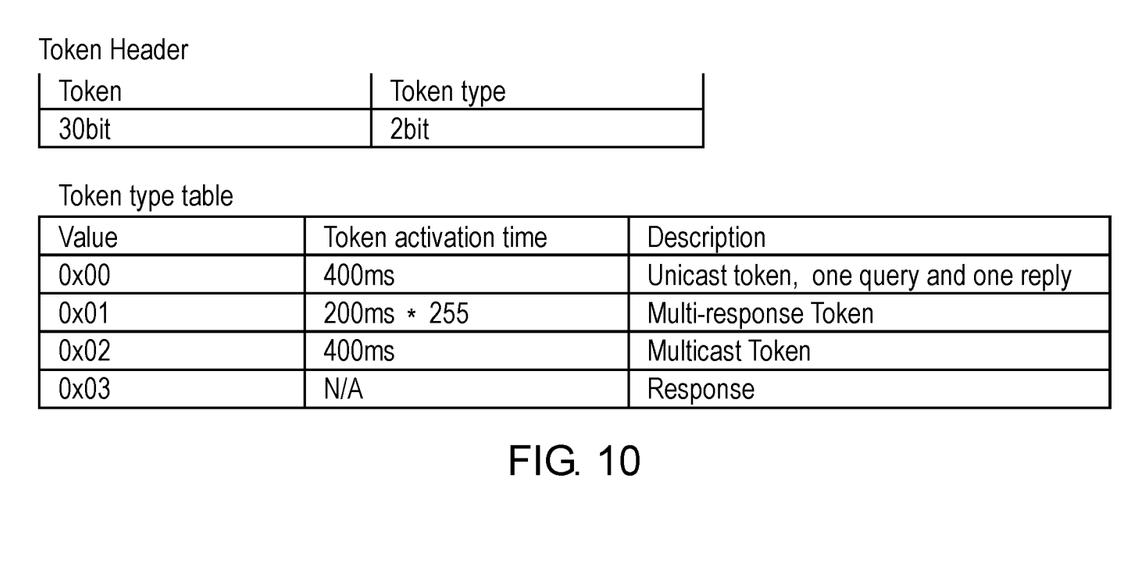
FIG. 10 is a schematic drawing illustrating example headers according to some embodiments.
Figure 11:
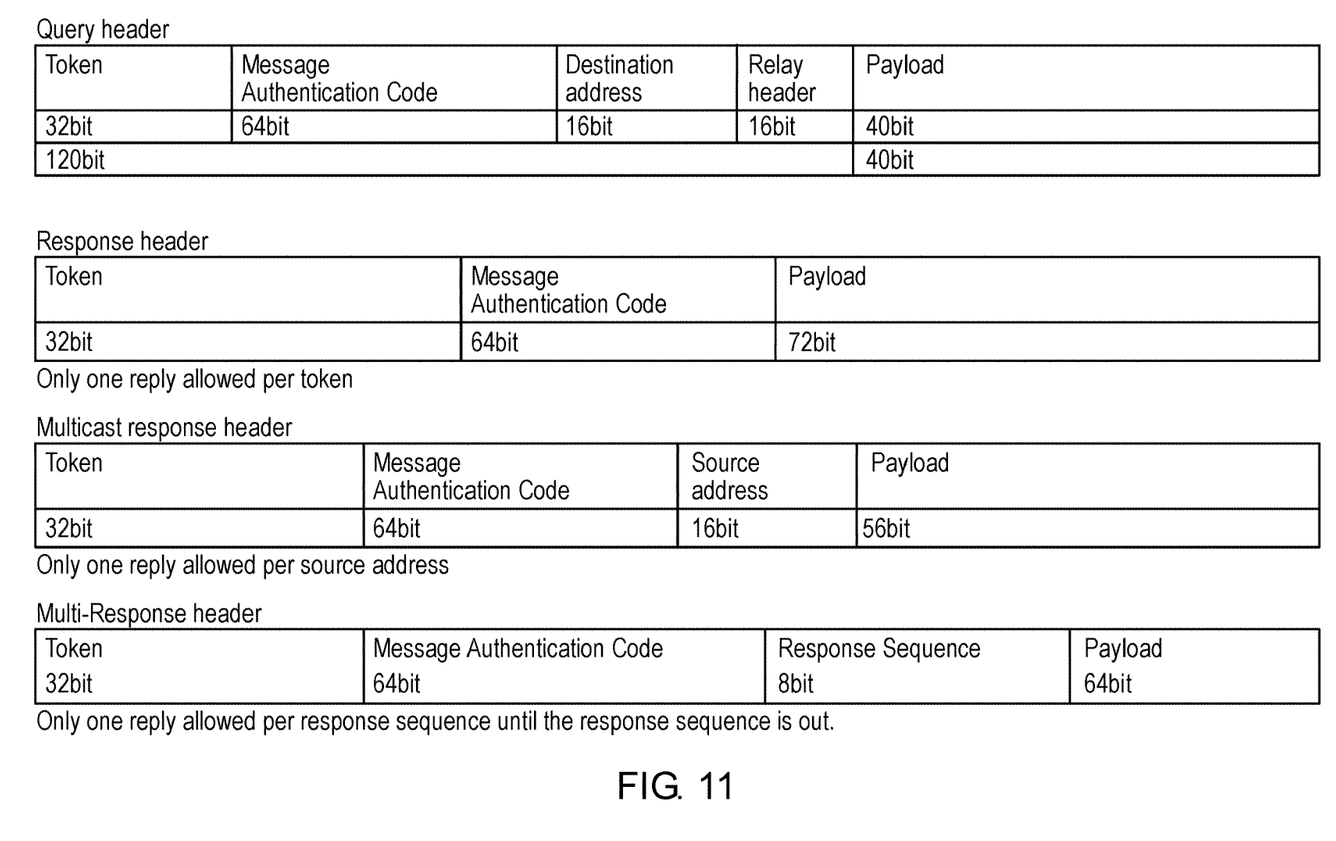
FIG. 11 is a schematic drawing illustrating example headers according to some embodiments.

FIGS. 10 to 11 illustrate example headers and tables according to some embodiments.

FIG. 10 illustrates an example token based relay header and a token type table according to some embodiments.

FIG. 11 illustrates a query header, a response header and a multicast response header according to some embodiments.

Figure 12:
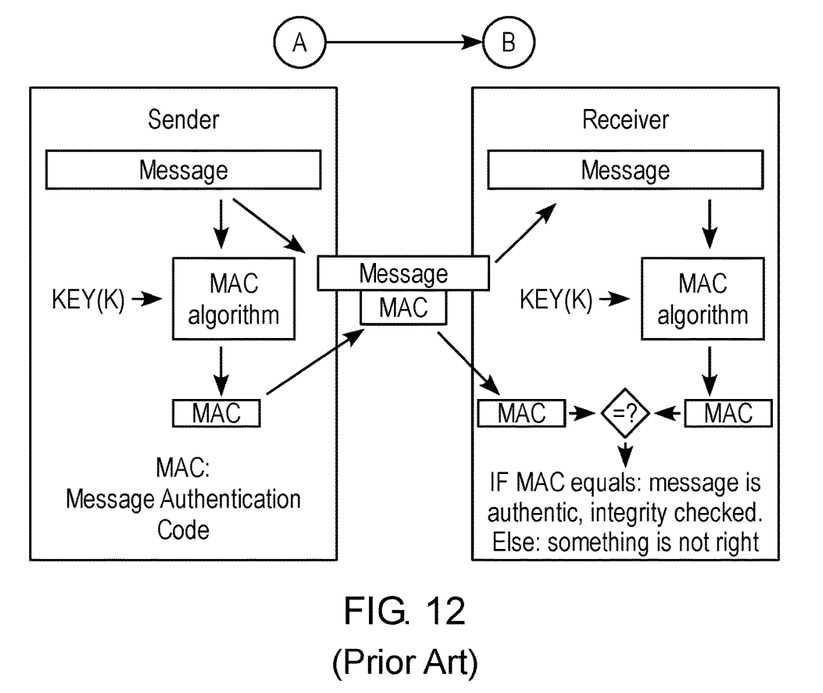
FIG. 12 is a schematic drawing illustrating an example MAC-procedure according to some embodiments.

FIG. 12 illustrates an example MAC-procedure according to some embodiments.

In FIG. 12 a sender node, for example the source node as described in conjunction with FIGS. 1, 2, 3, 4, 5 and 6, assembles a message (for example a data packet comprising a source ID, random token and a query). The Message Authentication Code (MAC) encrypts the message by producing a MAC algorithm by using a specific key. The MAC algorithm results in a MAC signature which is appended to the message prior to transmission.

At the receiver node (for example, the receiver node may be the destination node as described in conjunction with FIGS. 1, 2, 3, 4, 5, and 8) the received message is run through a MAC algorithm pertaining to the receiver node. This results in a MAC signature which is compared to the MAC signature which was appended to the message by the source node.

If the two MAC signatures are equal, then the message is authentic and integrity is checked. If the two MAC signatures are not equal, then it is an indication that something is not corrected. The message may for example have been compromised by an outside attacker.

Definitions

A querying node is a node transmitting a request to a receiver.

A responding node is a node transmitting a response to a querying node.

A relay is a node keeping track of the token validity and forwards valid packets.

Query

The querying node assembles a message with the header format described in FIG. 1.

The token consists of a random value of a token size. The Message Authentication Code (MAC) cryptographically validates the consistency of the packet.

The packet is transmitted to neighboring nodes as seen in FIG. 4 Query.

Relay Query

The relay forwards the packets after registering the packet.

The token and source will be stored in memory of each relay for a pre-defined period of time (the expected roundtrip time).

During the activation-time of a token a relay will not forward any other queries with the same token to prevent looping of packets.

When a packet is relayed a relay header is added describing the relays address or frequency for where to return a response. The relay header is described in FIG. 3.

Response

When the packet reaches its destination the responding node verifies the message authentication code.

The responding node assembles a response packet as seen in FIG. 2.

The response packet contains the same token as the query packet.

The response packet is validated using a Message Authentication Code generated for this packet.

The responding node transmits the response packet to the network.

Relay Response

As a relay receives the response it de-activates the token and forwards the response. This de-activation prevents looping of the response. As all relays store the token the response can be transmitted through relays to the querying node using any relay. This allows the nodes to move around geographically but still allowing the packet to find the shortest path to the querying node.

The response packet is transmitted on the relay frequency or address set by the relay header. This way the shortest path (and lowest latency) to the source will be used as only the first occurrence of a packet with a given token is stored.

The relay can uniquely verify each token by combining the source and token field values.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

Some embodiments may be realized by the following examples

1. A method of a mesh network, the method comprising
generating by a source node a random token to be comprised in a query packet comprising a query for a destination node;
transmitting the query packet comprising the random token, a source ID and the query to the destination node through a relay node;
receiving at the destination node the query packet;
adding, by the destination node, the random token to a response packet for the source node; and
transmitting the response packet comprising the random token to the source node through the relay node.

2. The method according to 1, wherein a communication session is initiated between the source node and the destination node when the response packet comprising the random token is received at the source node.

3. The method according to any of the preceding examples, wherein the relay node, upon receiving the query packet comprising the random token, source ID, and query to the destination node;
determines if the random token and source ID is stored in a memory of the relay node; if the random token and source ID is not stored in the memory of the relay node, then the relay node
stores the random token and an ID of the first node in a memory during a pre-defined period of time;
adds a relay header to the query packet comprising the random token and query, wherein the relay header comprises an ID of the relay node and/or a frequency;
forwards the query packet to the destination node; and if the random token and source ID is stored in the memory of the relay node, then the relay node
refrains from forwarding the query packet.

4. The method according to any of the preceding examples, wherein the destination node, upon receiving the query packet comprising the random token, source ID and query,
generates the response packet comprising the random token, source ID and the response to the source node;
generates a Message Authentication Code; and
validates the response packet using the Message Authentication Code.

5. The method according to any of the preceding examples, wherein the relay node, upon receiving the response packet comprising the random token, source ID and response to the first node,
determines if the random token and source ID is stored in the memory of the relay node, and if so
de-activates the random token; and
relays the response packet to the source node; and if not,
refrains from relaying the response packet to the source node.

6. A computer program product comprising a computer readable medium, having thereon a computer program comprising program instructions, the computer program being loadable into a data-processing unit and adapted to cause execution of the method according to any of 1 through 6 when the computer program is run by the data-processing unit.

7. An arrangement of a node in mesh network being a source node comprising a random token generator, a controller and a Message authentication Code module; wherein
the random token generator is configured to generate a random token;
the controller is configured to add a source ID, the random token and a query to a query packet to a destination node; and
the Message Authentication Code module is configured to encrypt the query packet and provide it with a signature.

8. The arrangement according to 7, wherein the source node further comprises a transmitter configured to transmit the query packet comprising the random token, source ID and query to the destination node through a relay node; and a receiver configured to receive a response packet comprising a response from the destination node relayed through the relay node.

9. An arrangement of a node in mesh network being a destination node comprising, a controller and a Message Authentication Code module; wherein the controller is configured to extract a random token comprised in a received query packet comprising a query and a source ID from a source node relayed through a relay node and add the extracted random token, source ID and a response to a response packet to the source node; and wherein the Message Authentication Code module is configured to decrypt the received query packet and encrypt the response packet comprising the response to the source node.

10. The arrangement according to 9, wherein the destination node further comprises a receiver configured to receive the query packet comprising a query, source ID and a random token from the source node relayed through the relay node; and a transmitter configured to transmit the response packet comprising the random token, source ID and response to the source node through the relay node.

11. An arrangement of a node in mesh network being a relay node comprising a controller and a memory; wherein the controller is configured to determine if the a random token comprised in a received query packet comprising a source ID and a query from a source node is stored in the memory and determine if the random token is valid; and wherein the memory is configured to store the random token and the source ID during a pre-defined period of time if it is determined by the controller that the random token is determined to be valid.

12. The arrangement according to 11, wherein the controller is further configured to determine if the random token received in the query packet comprising is already present in the memory, and if so determine that the random token is invalid and discard the data packet.

13. The arrangement according to any of 11 to 12, wherein if the controller determines that the random token is valid, the controller is further configured to relay the data packet to the destination node.

14. The arrangement according to any of 11 to 13, wherein the relay node further comprises a receiver configured to receive a query packet comprising a source ID, a query and a random token from the source node and/or a response packet comprising a random token, a source ID and a response from the destination node; and a transmitter configured to transmit the query packet to the destination node and/or the response packet to the source node.

15. The arrangement according to 14, wherein the controller is further configured to determine if the random token and source ID received in the response packet is stored in the memory, and if so, determine that the random token is valid and de-activate the random token from memory by removing it and the source ID from memory; and if the controller determines that the random token and source ID is not stored in the memory, the controller is further configured to determine that the random token state is invalid and discard the response packet.

16. A mesh network comprising a source node and a destination node and at least one relay node, wherein the source node configured to generate a random token value to be comprised in a query packet comprising a query for the destination node and transmitting the query packet comprising the random token value, a source ID and the query to the destination node through the relay node, wherein the destination node is configured to receive the query packet and add the random token value to a response packet for the source node; and wherein the destination node is configured to transmit the response packet comprising the random token value to the source node through the relay node.

17. The mesh network according to 16, wherein a communication session is initiated between the source node and the destination node when the response packet comprising the random token is received at the source node.

18. The mesh network according to any of 16-17, wherein the relay node is further configured to, upon receiving the query packet comprising the random token, source ID, and query to the destination node;

determine if the random token and source ID is stored in a memory of the relay node; if the random token and source ID is not stored in the memory of the relay node, then the relay node store the random token and an ID of the first node in a memory during a pre-defined period of time;

add a relay header to the query packet comprising the random token and query, wherein the relay header comprises an ID of the relay node and/or a frequency; and forward the query packet to the destination node; and if the random token and source ID is stored in the memory of the relay node, then the relay node is configured to refrain from forwarding the query packet.

19. The mesh network according to any of 16-18, wherein the destination node is further configured to, upon receiving the query packet comprising the random token, source ID and query, generate the response packet comprising the random token, source ID and the response to the source node;

generate a Message Authentication Code; and validate the response packet using the Message Authentication Code.

20. The mesh network according to any of 16-19, wherein the relay node is further configured to, upon receiving the response packet comprising the random token, source ID and response to the first node, determine if the random token and source ID is stored in the memory of the relay node, and if so de-activate the random token; and relay the response packet to the source node; and if not, refrain from relaying the response packet to the source node.

The invention claimed is:

1. A method of a mesh network, wherein the mesh network comprises a source node, at least one relay node and a destination node, the method comprising:

generating by the source node a random token to be comprised in a query packet;

transmitting by the source node the query packet to the destination node through a first relay node of the at least one relay node, wherein the query packet comprises the random token, a source ID, and a query for the destination node;

determining by the first relay node if the random token is stored along with the source ID in a memory of the first relay node; and discarding the query packet by the first relay node and refraining from forwarding the query packet to the destination node if it is determined by the first relay node that the random token and the source ID comprised in the query packet are stored in the memory;
wherein if it is determined that the random token and the source ID are not stored in the memory of the first relay node, the method further comprises:
adding by the first relay node the random token and source ID to the memory of the first relay node;
forwarding by the first relay node the query packet to the destination node;
receiving by the destination node the query packet;
adding, by the destination node, the random token, the source ID, a Message Authentication Code (MAC) and a response for the source node to a response packet; and
transmitting, by the destination node, the response packet comprising the random token to the source node through the first relay node,
wherein upon receiving by the first relay node the response packet, the method further comprises:
determining, by the first relay node, if the random token and source ID comprised in the response packet are stored in the memory of the first relay node, and if so:
deactivating by the first relay node the random token; and
relaying by the first relay node the response packet to the source node;
and if not:
refraining, by the first relay node, from relaying the response packet to the source node.

2. The method according to claim 1, wherein a communication session is initiated between the source node and the destination node when the response packet comprising the random token is received at the source node.

3. The method according to claim 1, wherein, upon determining by the first relay node that the random token and source ID comprised in the query packet are not stored in the memory of the first relay node:
adding by the first relay node the random token and source ID to the memory of the first relay node comprises:
storing by the first relay node the random token and source ID in the memory during a pre-defined period of time; and
the method further comprises:
adding a relay header to the query packet comprising the random token and query, wherein the relay header comprises one or more of an ID of the first relay node and a frequency.

4. The method according to claim 1, wherein upon receiving the query packet by the destination node, the method further comprises:
generating by the destination node the response packet comprising the random token, source ID and the response for the source node;
generating by the destination node the Message Authentication Code; and
validating by the destination node the response packet using the Message Authentication Code.

5. A non-transitory computer readable storage medium, having thereon a computer program comprising program instructions, the computer program being loadable into a data-processing unit and adapted to cause execution of a method of a mesh network when the computer program is run by the data-processing unit, wherein the mesh network comprises a source node, at least one relay node and a destination node, and wherein the method comprises:
generating by the source node a random token to be comprised in a query packet;
transmitting by the source node the query packet to the destination node through a first relay node of the at least one relay node, wherein the query packet comprises the random token, a source ID, and a query for the destination node;
determining by the first relay node if the random token is stored along with the source ID in a memory of the first relay node; and
discarding the query packet by the first relay node and refraining from forwarding the query packet to the destination node if it is determined by the first relay node that the random token and the source ID comprised in the query packet are stored in the memory;
wherein if it is determined that the random token and the source ID are not stored in the memory of the first relay node, the method further comprises:
adding by the first relay node the random token and source ID to the memory of the first relay node;
forwarding by the first relay node the query packet to the destination node;
receiving by the destination node the query packet;
adding, by the destination node, the random token, the source ID, a Message Authentication Code (MAC) and a response for the source node to a response packet; and
transmitting, by the destination node, the response packet comprising the random token to the source node through the first relay node,
wherein upon receiving by the first relay node the response packet, the method further comprises:
determining, by the first relay node, if the random token and source ID comprised in the response packet are stored in the memory of the first relay node, and if so:
deactivating by the first relay node the random token; and
relaying by the first relay node the response packet to the source node;
and if not:
refraining, by the first relay node, from relaying the response packet to the source node.

6. An arrangement of a relay node in a mesh network, wherein the arrangement comprises:
a controller;
a memory; and
a transceiver;
wherein the transceiver is configured to receive a packet comprising a random token and a source ID, wherein the received packet is a query packet or a response packet, and
wherein if the received packet is the query packet, the controller is configured to cause:
determination of whether the random token is stored along with the source ID in the memory; and
discarding of, and refraining from forwarding, the query packet to the destination node if it is determined that the random token and the source ID comprised in the query packet are stored in the memory; and
if it is determined that the random token and the source ID are not stored in the memory, then:
the memory is configured to store the random token and the source ID; and the transceiver is configured to forward the query packet to a destination node; and wherein if the received packet is the response packet, the controller is configured to cause:

determination of whether the random token and source ID comprised in the response packet are stored in the memory, and if so:

the controller is configured to cause deactivation of the random token; and the transceiver is configured to cause relaying of the response packet to the source node;

and if the random token and source ID are determined not to be stored in the memory, the transceiver is further configured to:

refrain from relaying the response packet to the source node.

7. A mesh network comprising:
a source node;
a destination node; and
at least one relay node,
wherein the source node is configured to generate a random token to be comprised in a query packet and transmit the query packet to the destination node through a first relay node of the at least one relay node, wherein the query packet comprises the random token, a source ID, and a query for the destination node, and wherein the first relay node is configured to:
determine if the random token is stored along with the source ID in a memory of the first relay node; and
discard the query packet and refrain from forwarding the query packet to the destination node if it is determined that the random token and the source ID comprised in the query packet are stored in the memory of the first relay node, wherein if it is determined that the random token and the source ID are not stored in the memory of the first relay node, the first relay node is further configured to:

forward the query packet to the destination node, wherein the destination node is configured to:
receive the query packet and add the random token to a response packet for the source node; and wherein the destination node is further configured to transmit the response packet comprising the random token to the source node through the first relay node, and wherein upon receiving the response packet, the first relay node is further configured to:

determine if the random token and source ID comprised in the response packet are stored in the memory of the first relay node, and if so:

deactivate the random token; and
relay the response packet to the source node; and if the random token and source ID comprised in the response packet are determined not to be stored in the memory of the first relay node, the first relay node is further configured to:

refrain from relaying the response packet to the source node.

8. The mesh network according to claim 7, wherein a communication session is initiated between the source node and the destination node when the response packet comprising the random token is received at the source node.

9. The mesh network according to claim 7, wherein upon the first relay node reaching a determination that the random token and source ID comprised in the query packet are not stored in the memory of the first relay node, the first relay node is further configured to store the random token and the source ID in the memory of the first relay node during a pre-defined period of time and add a relay header to the query packet comprising the random token and query, wherein the relay header comprises one or more of an ID of the first relay node and a frequency.

10. The mesh network according to claim 7, wherein the destination node is further configured to, upon receiving the query packet:

generate the response packet comprising the random token, source ID and a response for the source node;
generate a Message Authentication Code; and
validate the response packet using the Message Authentication Code.

* * * * *